United States Patent [19]
Oka et al.

[11] Patent Number: 5,237,366
[45] Date of Patent: Aug. 17, 1993

[54] SCANNING EXPOSURE-REPRODUCTION APPARATUS AND SCALING REPRODUCTION METHOD THEREFOR

[75] Inventors: Yasuyuki Oka; Satoshi Taniguchi, both of Hikone, Japan

[73] Assignee: Dainippon Screen Mfg. Co., Ltd., Japan

[21] Appl. No.: 795,130

[22] Filed: Nov. 20, 1991

[30] Foreign Application Priority Data

Nov. 20, 1990 [JP] Japan .................. 2-316822
Oct. 23, 1991 [JP] Japan .................. 3-305458

[51] Int. Cl.$^5$ .............. G03B 27/48; G03B 27/50; G03B 27/70
[52] U.S. Cl. .................. 355/51; 355/57; 355/60; 355/61; 355/234; 355/243
[58] Field of Search .............. 355/51, 57, 60, 61, 355/55, 56, 243, 234

[56] References Cited

U.S. PATENT DOCUMENTS

| 4,782,364 | 11/1988 | Takagi | 355/30 |
| 4,903,079 | 2/1990 | MacAndrew | 355/57 |

FOREIGN PATENT DOCUMENTS 3942665 6/1990 Fed. Rep. of Germany .

OTHER PUBLICATIONS

Patent Abstracts of Japan vol. 14, No. 160, Mar. 1990 & JP-A-20 16 582.

*Primary Examiner*—Monroe H. Hayes
*Attorney, Agent, or Firm*—Ostrolenk, Faber, Gerb & Soffen

[57] ABSTRACT

When an input reproduction scale m is equal to a value m1a which lies in a reproduction scale section m1, rated moving speeds U1a and U2a corresponding to the reproduction scale m and a resonance point avoidance coefficient k1 ($=1$) are read in, and practical moving speeds V1a ($=k1 \times U1a = U1a$) and V2a ($=k1 \times U2a = U2a$) of a holder 2 and a cylindrical drum 10 are determined with the above data. On the other hand, when the input reproduction scale m is equal to a value m2b which lies in another reproduction scale section m2, rated moving speeds U1b and U2b corresponding to the reproduction scale m and a resonance point avoidance coefficient k2 ($\neq 1$) are read in, and practical moving speeds V1b ($=k2 \times U1b \neq U1b$) and V2b ($=k2 \times U2b \neq U2b$) are determined with the above data. While the reproduction scale corresponding to the ratio of the practical moving speeds V1b and V2b is maintained equal to the input reproduction scale m2b, the practical moving speed V1b is set as a moving speed of a movable speed area IB which lies outside a non-use speed area IA.

12 Claims, 11 Drawing Sheets

SCANNING EXPOSURE-REPRODUCTION APPARATUS AND SCALING REPRODUCTION METHOD THEREFOR

BACKGROUND OF THE INVENTION

1. Field of the Invention

The present invention relates to a scaling method, involving controlling the magnification or minification of reproduction, applied to scanning exposure-reproduction of an original by a predetermined factor to produce a printing film, and also to a reproduction apparatus, according to the principles of scaling scan.

2. Description of the Background Art

An example of such scanning exposure-reproduction apparatus is disclosed in Japanese Patent Laying-Open Gazette No.2-137837 by the applicant of the present invention.

A scanning exposure-reproduction apparatus shown in FIG. 1 focuses a scaled reproduced image of an original held on a holder 2 onto a cylindrical drum 10 by means of scanning exposure. The scanning exposure-reproduction apparatus includes: the holder 2 horizontally movable along a pathway 1; the cylindrical drum 10 for holding a sensitized material, which is synchronously rotatable with the movement of the holder 2 and functions as a projection base; a series of optical devices for scaling projection including a lens 15 and mirrors 14b and 14c, which are disposed around the cylindrical drum 10; a series of optical devices for photographing including a light source 13 and a mirror 14a, which are disposed on the upper face of the holder 2; sensitized material conveying units 17 and 18 for feeding a sensitized material 19 in and out of the cylindrical drum 10; and a control panel 21 for setting a reproduction scale and other conditions.

The holder 2 and the optical devices for photographing constitute a photographing optical system, which is used for photographing a slit image spanning the width of an original and relatively moving the photographing position of the slit image in the longitudinal direction of the original. The speed of the relative movement is changeable within a predetermined range.

The cylindrical drum 10 and the optical devices for scaling projection, on the other hand, constitute a projecting optical system, which projects the slit image along the width of the sensitized material and relatively moves the exposure position of the slit image in the longitudinal direction of the sensitized material at a predetermined speed.

In scaling scan, the cylindrical drum 10 actuated by a driving motor (not shown in figures) rotates at a fixed speed while the holder 2 actuated by a holder driving motor 6 moves at a predetermined speed based on a reproduction scale input through the control panel 21. The reproduction scale in the longitudinal direction of the sensitized material represents a ratio of the rotating speed of the cylindrical drum 10 to the moving speed of the holder 2. The moving speed of the holder 2 is thus determined with both the rotating speed of the cylindrical drum 10 and the input value of the reproduction scale. The reproduction scale in the transverse direction of the sensitized material is determined by the position of the lens 15 and the mirrors 14b, 14c along the optical axis.

The scanning-exposure reproduction device allows free setting of the reproduction scale in the longitudinal direction based on the moving speed of the photographing optical system and thus realizes scaling reproduction in spite of its limited space.

With recent extensive use of printed matter, reproduction devices of high quality and of a wider scaling range are highly required for producing a desirable printing plate from an original. For example, an original of A2 size should be enlarged to printed matter of B0 or A0 sizes.

Since the reproduction scale in the longitudinal direction of the sensitized material represents the ratio of the rotating speed of the cylindrical drum 10 to the moving speed of the holder 2 as mentioned above, a specific motor having a sufficiently wide range of rated speed change is used as the driving source of the holder 2 so as to expand the range of reproduction scale.

Such a driving motor with a wide range of rated speed change, however, has a complicated structure and thus requires time- and labor-consuming maintenance and high manufacturing cost.

On the other hand, enlargement by a large scale factor without the specific driving motor requires the steps of: enlarging an original by a predetermined factor to produce printed matter and further enlarging the printed matter by a certain factor. This method uses the intermediate printed matter as the original of final reproduction and thus causes poor image quality of the final printed matter. Similar problems arise when an original is reproduced by a reducing ratio.

With recent requirements for better image quality, unevenness of an image by a reproduction device, which has been neglected, needs to be removed. In the scanning exposure-reproduction apparatus, slight changes of the moving speed causes unstable exposure of an original and produces uneven stripes on a recording image and thereby lowers the quality of the image.

The photographing optical system including the holder 2 (hereinafter referred to as the holder system) and the projecting optical system including the cylindrical drum 10 (hereinafter referred to as the projection system) are driving systems or vibration systems each having a vibration source. When the frequency of a driving motor or a reduction gear functioning as the vibration source is comparable to the natural frequency of the driving system, resonance causes change of the moving speed of the holder 2 or the cylindrical drum 10, which results in poor image quality. Accordingly, actuation of the holder system in the vicinity of the resonance point is not recommendable.

In a reproduction device which executes reproduction by a predetermined factor m within a fixed scale range of a driving source (driving motor), the speed of rotation of the driving motor is previously set not to be close to the resonance point. In some cases, the speed of rotation previously set, however, exceeds the range of the rated driving speed or the rated rotating speed of the driving motor corresponding to the scale range; that is, actuation in the vicinity of the resonance point can not always be avoided.

Use of a specific motor with a sufficiently wide range of rated speed change or use of a highly rigid driving system may be considered to keep away from or shift the resonance point. One driving system generally has plural resonance points, and thus these methods are neither practical nor economical.

SUMMARY OF THE INVENTION

The general objective of the invention is accordingly to improve the quality of a magnified or minified image without using a special motor having a sufficiently wide range of rated speed change.

The specific objective of the invention is to attain a wider range of reproduction scale and to remove unevenness of a reproduced image.

The above and other related objectives are realized by a scanning exposure-reproduction apparatus, which includes: a photographing optical system for photographing a slit image spanning the width of an original and relatively moving the photographing position of the slit image in the longitudinal direction of the original;

a projecting optical system for projecting the slit image along the width of a sensitized material and relatively moving the exposure position of the slit image in the longitudinal direction of the sensitized material;

variable speed driving means for varying the moving speed of one of the optical systems in a multi-stage speed range and driving the one optical system;

driving means for driving the other of the optical systems at a predetermined moving speed;

scale setting means for setting the reproduction scale of the original based on external instructions;

moving speed setting means for setting the relative moving speed of the one optical system within the shiftable speed range and the relative moving speed of the other optical system based on the reproduction scale; and speed control means for controlling the variable speed driving means and the driving means to actuate the optical systems at the moving speeds set by the moving speed setting means.

In the scanning exposure-reproduction apparatus of such a structure, the relative moving speed of one of the optical systems, that is, either the photographing optical system or the projecting optical system, is shiftable between two or more moving speed ranges by the variable speed driving means. There are thus two or more combinations of the moving speeds of the optical systems; the moving speeds of one optical system before and after a shift and the moving speed of the other optical system. Namely, two or more values are available for the reproduction scale, which corresponds to the ratio of the moving speeds of the optical systems.

The moving speed setting means gives the relative moving speeds to the optical systems based on the reproduction scale determined by the scale setting means; that is, the moving speed setting means selects one combination of the moving speeds out of the plural combinations. After the moving speeds are selected, the speed control means controls the variable speed driving means and the driving means to actuate the optical systems at the determined moving speeds, and reproduces an original by a reproduction scale corresponding to the ratio of the moving speeds of the optical systems.

The reproduction scale determined by the scale setting means coincides with the reproduction scale corresponding to the ratio of the moving speeds of the optical systems. At least two different values are available for respectively changing the reproduction scale set by the scale setting means; the values vary corresponding to the speed ranges between which the relative moving speed of one optical system is shiftable by the variable speed driving means. Such a shift of the moving speed is executed within the power of a driving source or a standard driving motor, and does not require any specific driving motor with a sufficiently wide range of rated driving speed. Furthermore, the device of the invention does not require repeated enlargement and thereby ensures high quality of a reproduced image.

According to an aspect of the invention, a photographing optical system for photographing a slit image spanning the width of an original and relatively moving the photographing position of the slit image in the longitudinal direction of the original;

a projecting optical system for projecting the slit image along the width of a sensitized material and relatively moving the exposure position of the slit image in the longitudinal direction of the sensitized material;

scale setting means for setting the reproduction scale of the original based on external instructions;

moving speed setting means for respectively setting the relative moving speeds of the optical systems based on the reproduction scale;

moving speed check means for determining whether either of the moving speeds of the optical systems is within an inherent non-use speed area of the optical system; and moving speed changing means for, when the moving speed is determined to be within the inherent non-use speed area by the moving speed check means, the moving speeds of the optical systems, which are set by the moving speed setting means, to different values while the ratio of the moving speeds of the optical systems remains unchanged.

In the scanning exposure-reproduction apparatus of the above another structure, the relative moving speeds of the photographing optical system and the projecting optical system are set by the moving speed setting means according to the reproduction scale determined by the scale setting means. The moving speed check means then determines whether either of the moving speeds of the optical systems is within an inherent non-use speed area of the optical system. When the moving speed is determined to be within the inherent non-use speed area, the moving speed changing means respectively changes the moving speeds of the optical systems, which are set by the moving speed setting means, to different values while the ratio of the moving speeds of the optical systems remains unchanged.

Such a change of the relative moving speeds of the optical systems allows the optical systems to be driven at moving speeds other than the non-use speed area while keeping the constant reproduction scale corresponding to the ratio of the moving speeds of the optical systems. The non-use speed area may include a range of the moving speed which causes unstable scanning of the optical system. The device of the invention, however, securely drives the optical systems at moving speeds outside the non-use speed area, and thus prevents possible adverse effects of the unstable moving or unevenness of the reproduced image to improve the quality of the image.

The present invention is also directed to a scaling reproduction method for reproducing an original by driving a photographing optical system for photographing a slit image spanning the width of an original and relatively moving the photographing position of the slit image in the longitudinal direction of the original; and a projecting optical system for projecting the slit image along the width of a sensitized material and relatively moving the exposure position of the slit image in the longitudinal direction of the sensitized material;

comprising the steps of:
previously determining a rated speed pattern against a reproduction scale for a relative moving speed of each of the optical systems;

setting the rated speed pattern of at least one of the optical systems as a monotonous speed variation pattern representing a monotonous variation of the moving speed against the reproduction scale;

creating a non-rated speed pattern of at least one of the optical systems by multiplying the moving speed in the rated speed pattern of the one optical system by a predetermined factor k;

computing the moving speeds of the optical systems based on the moving speed pattern, either the rated speed pattern or the non-rated speed pattern, of the one optical system and the moving speed pattern of the other optical system, so that the reproduction scale corresponding to the ratio of the moving speeds of the optical systems is made equal to an externally input reproduction scale; and moving the optical systems at the computed moving speeds.

In the above method of scaling reproduction, a non-rated speed pattern of the relative moving speed is created for either or both of the photographing optical system and the projecting optical system. The moving speed of at least one optical system is thereby selected out of the rated speed pattern and the non-rated speed pattern. Two or more combinations are available for the moving speeds of the optical systems; a combination of both the rated speed patterns and another combination of the rated speed pattern and the non-rated speed pattern.

The moving speeds of the optical systems are computed with the moving speed pattern, either the rated speed pattern or the non-rated speed pattern, of one optical system and the moving speed pattern of the other optical system, so that the reproduction scale corresponding to the ratio of the moving speeds of the optical systems is made equal to an externally input reproduction scale. The optical systems are then driven at the calculated practical moving speeds, and the original is reproduced by the reproduction scale corresponding to the ratio of the moving speeds of the optical systems, that is, the externally input reproduction scale.

The moving speed of the non-rated speed pattern is determined by multiplying that of the rated speed pattern by the predetermined factor k. Namely, the reproduction scale computed with the practical moving speeds of the optical systems in the combination of the rated speed pattern and the non-rated speed pattern is also determined by multiplying the same computed with the practical moving speeds of the optical systems in the combination of both the rated speed pattern by the predetermined factor k. The method of the invention allows a wider range of reproduction scale using the conventional driving motor with the standard rated driving speed, and prevents repeated enlargement to improve the quality of the reproduced image.

The non-rated speed pattern is created for the variable speed driving system, that is, the optical system having the monotonous speed variation pattern as the rated speed pattern. Namely, the variable speed driving system may be moved at the moving speed according to either the rated speed pattern or the non-rated speed pattern.

A moving speed range in the rated speed pattern of the variable speed driving system is divided into a non-use speed area including one or plural resonance points of the variable speed driving system and a movable speed area other than the non-use speed area. When an externally input reproduction scale coincides with the reproduction scale computed with the moving speed of the non-use speed area in the rated speed pattern of the variable speed driving system, the moving speed pattern of the variable speed driving system is switched from the rated speed pattern to the non-rated speed pattern. The predetermined factor k used for conversion of the moving speed between the rated speed pattern and the non-rated speed pattern is set to make the moving speed of the non-rated speed pattern equal to that of the movable speed area. Meantime, the moving speed pattern of the optical system other than the variable speed driving system is changed to a moving speed pattern determined by multiplying the moving speed in the rated speed pattern of the other optical system by the factor k.

When the externally input reproduction scale is equal to the reproduction scale computed with the moving speed of the non-use speed area in the rated speed pattern of the variable speed driving system, the variable speed driving system is moved at the moving speed multiplied by the factor k, which is other than the non-use speed area but within the movable speed area. On the other hand, the other optical system is driven at the moving speed determined by multiplying the same of the rated speed pattern by the factor k.

The method of the invention respectively moves the optical systems at the moving speeds determined by multiplying those in the rated speed pattern by the factor k, and thereby has no effect on the reproduction scale corresponding to the ratio of the moving speeds of the optical systems. Furthermore, the method prevents the variable speed driving system from being moved at the moving speed in the non-use speed area of the rated speed pattern, and thereby efficiently prevents undesirable resonance of the variable speed driving system using a conventional driving motor with the standard rated driving speed. Accordingly, the method prevents unstable scanning due to resonance of the variable speed driving system, which may cause unevenness of the reproduced image, and allows quality improvement of the reproduced image.

The method removes such undesirable resonance only by correcting the practical moving speed of each driving system in a rated speed range with the predetermined factor k. The method accordingly uses a conventional driving speed with the standard rated speed as the driving motor of the variable speed driving system, and does not require any specific driving motor with a wider speed variation. Namely, the invention ensures high quality of the reproduced image at a low cost, and effectively improves the conventional device by only simple modification.

The present invention is farther directed to a scanning exposure-reproduction apparatus for driving a photographing optical system for photographing a slit image spanning the width of an original and relatively moving the photographing position of the slit image in the longitudinal direction of the original; and a projecting optical system for projecting the slit image along the width of a sensitized material and relatively moving the exposure position of the slit image in the longitudinal direction of the sensitized material, and reproducing the original by a reproduction scale corresponding to a ratio of relative moving speeds of the optical systems;

comprising:

rated pattern memory means for storing a moving speed pattern representing the relative moving speed of each of the optical systems as a rated speed pattern against the reproduction scale, and specifically storing a monotonous speed variation pattern representing a monotonous variation of the moving speed against the reproduction scale as the rated speed pattern of at least one of the optical systems;

non-rated pattern creation means for creating a non-rated speed pattern of at least one of the optical systems by multiplying the moving speed in the rated speed pattern of the one optical system stored in the rated pattern memory means by a predetermined factor k;

first driving means for driving the one optical system with the non-rated speed pattern at the moving speed corresponding to the rated speed pattern or the non-rated speed pattern within a rated output of a driving source;

second driving means for driving the other of the optical systems;

moving speed computing means for computing the moving speeds of the optical systems based on the moving speed pattern, either the rated speed pattern or the non-rated speed pattern, of the one optical system and the moving speed pattern of the other optical system, so that the reproduction scale corresponding to the ratio of the moving speeds of the optical systems is made equal to an externally input reproduction scale; and control means for controlling the first and second driving means and moving the optical systems at the computed moving speeds.

The scanning exposure-reproduction apparatus for reproducing an original according to the above method has the rated pattern memory means, which stores the rated speed patterns of the relative moving speeds of the optical systems, and more specifically stores a monotonous speed variation pattern representing a monotonous variation of the moving speed against the reproduction scale as the rated speed pattern for at least one of the optical systems. The non-rated pattern creation means creates a non-rated speed pattern based on the rated speed pattern stored in the rated pattern memory means for at least one of the optical systems.

The moving speed of at least one optical system is thereby selected out of the rated speed pattern and the non-rated speed pattern, and two or more combinations are available for the moving speeds of the optical systems. The moving speed computing means computes the moving speeds of the optical systems based on the moving speed pattern, either the rated speed pattern or the non-rated speed pattern, of one optical system and the moving speed pattern of the other optical system, so as to make the reproduction scale corresponding to the ratio of the moving speeds of the optical systems equal to an externally input reproduction scale.

The control means controls the first driving means for actuating one optical system with the non-rated speed pattern and the second driving means for actuating the other optical system, and moves the optical systems at the calculated moving speeds. Since two or more different values are available for the reproduction scale by multiplying the predetermined factor k, the device of the invention allows a wider range of reproduction scale using a conventional driving motor with the standard rated driving speed. The invention thus prevents repeated enlargement and ensures high quality of the reproduced image.

BRIEF DESCRIPTION OF THE DRAWINGS

The invention may be best understood by referring to the following detailed description of the preferred embodiment and the accompanying drawings, wherein like numerals denote like elements and in which.

DESCRIPTION OF THE PREFERRED EMBODIMENT

Figure 1:
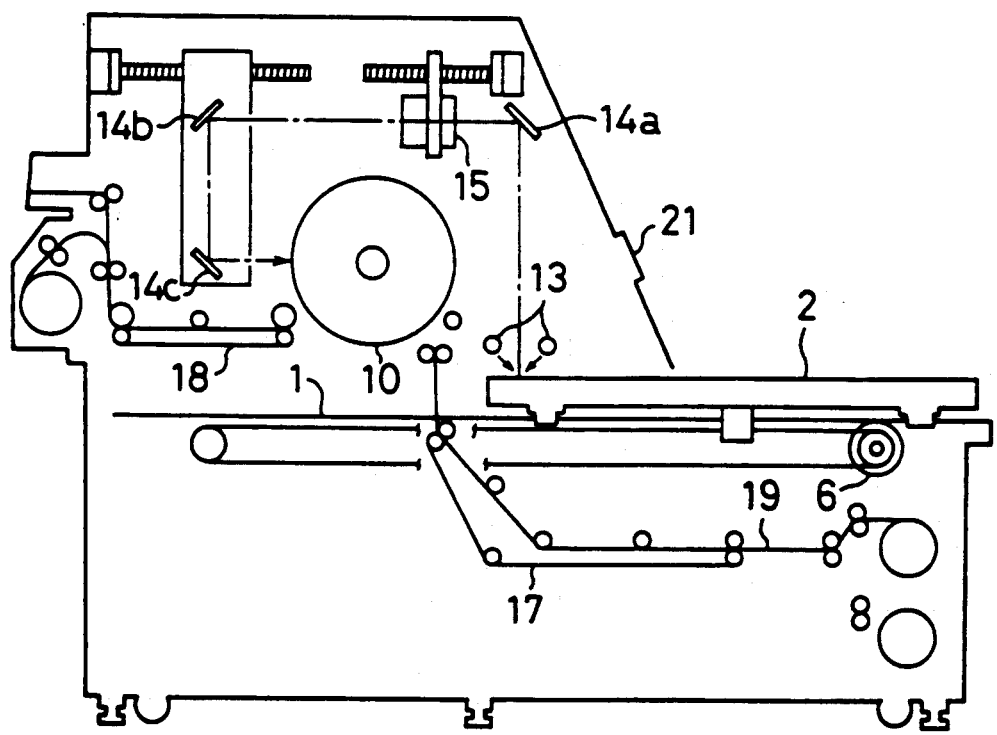
FIG. 1 is a schematic view illustrating a basic structure of a scanning exposure-reproduction apparatus.

A scanning exposure-reproduction apparatus embodying the invention is explained in detail according to the drawings. The scanning exposure-reproduction apparatus of the embodiment has substantially the same structure as the conventional scanning exposure-reproduction apparatus shown in FIG. 1, except for electrical constituents shown in FIG. 2 and the processing thereof. The unique constituents of the embodiment which distinguish it from the conventional device are described in detail while the conventional constituents such as a cylindrical drum are briefly explained.

Figure 2:
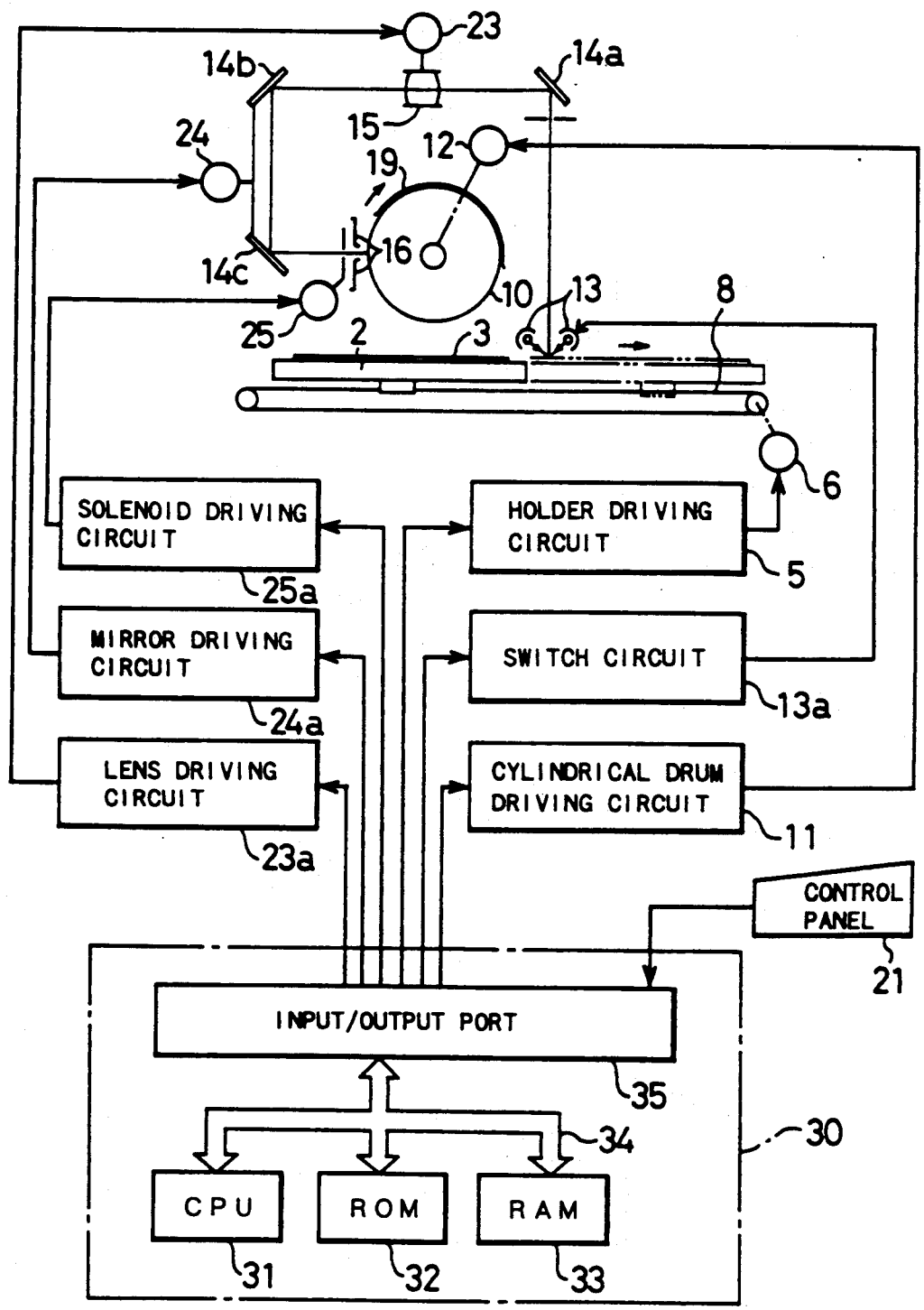
FIG. 2 is a block diagram showing electrical constituents of the scanning exposure-reproduction apparatus embodying the invention.

An electronic control circuit 30 for driving and controlling constituents of the scanning exposure-reproduction unit of the embodiment is described based on the block diagram of FIG. 2.

The electronic control circuit 30 is composed as a logic/operation circuit including a CPU (central processing unit) 31, a ROM (read only memory) 32, and a RAM (random access memory) 33, which are connected to an input/output port 35 via a common bus 34.

The input/output port 35 of the electronic control circuit 30 is connected to: a control panel 21 for inputting a reproduction scale m and other conditions; a holder driving circuit 5 for actuating a holder 2; a cylindrical drum driving circuit 11 for actuating a cylindrical drum 10; a lens driving circuit 23a for setting the position of a lens 15 in a series of optical devices for scaling projection disposed around the cylindrical drum 10; a mirror driving circuit 24a for setting the positions of mirrors 14b and 14c in the series of optical devices; a solenoid driving circuit 25a for setting an opening width D of an exposure slit 16; and a switch circuit 13a for turning on and off a light source 13 disposed on the upper face of the holder 2.

The ROM 32 of the electronic control circuit 30 stores rated speeds or rated speed patterns U1 and U2 of the holder 2 and the cylindrical drum 10 and resonance point avoidance coefficients k (k1 through k3) corresponding to the reproduction scale m input through the control panel 21.

When a value of the reproduction scale m is input through the control panel 21, the electronic control circuit 30 computes practical moving speeds V1 and V2 of the holder 2 and the cylindrical drum 10, which functions as the projection base, based on the input reproduction scale m. The electronic control circuit 30 simultaneously outputs control signals to the holder driving circuit 5 and the cylindrical drum driving circuit 11 so as to actuate the holder 2 and the cylindrical drum 10 at the computed practical moving speeds. The holder driving circuit 5 receives the control signal and changes the moving speed of the holder 2 according to the scale m, while the cylindrical drum driving circuit 11 rotates the cylindrical drum 10 at a constant speed except in a scale range corresponding to a non-use speed area IA (described below). A reproduced image scaled by m is accordingly focused and recorded on a sensitized material 19 set on the cylindrical drum 10. Computation of the practical moving speeds V1 and V2 of the holder 2 and the cylindrical drum 10 will be described later.

The lens driving circuit 23a actuates a lens driving motor 23 to set the position of the lens 15 corresponding to the scale m, whereas the mirror driving circuit 24a actuates a mirror driving motor 24 to set the positions of the mirrors 14b and 14c. Meantime, the solenoid driving circuit 25a actuates a solenoid 25 to set the opening width D of the exposure slit 16 corresponding to the practical moving speed V2.

The holder driving circuit 5 receives the control signal from the electronic control circuit 30, outputs a driving signal to a holder driving motor 6 to actuate the motor 6, and moves the holder 2 at a variable moving speed or the practical moving speed V1 via a reduction gear 7 (see FIG. 3) and a transmission belt 8. The moving speed of the holder 2 is changeable by varying the driving signal output to the holder driving motor 6. Namely, the holder system is composed as a variable speed driving system with a changeable moving speed.

On the other hand, the cylindrical drum driving circuit 11 receives the control signal from the electronic control circuit 30, outputs a driving signal to a cylindrical drum driving motor 12 to actuate the motor 12, and moves the cylindrical drum 10 at a predetermined constant speed or the practical moving speed V2 via a reduction gear and a transmission gear (not shown in figures). Namely, the projection system including the cylindrical drum 10 is composed as a constant speed driving system with a constant moving speed.

Figure 3:
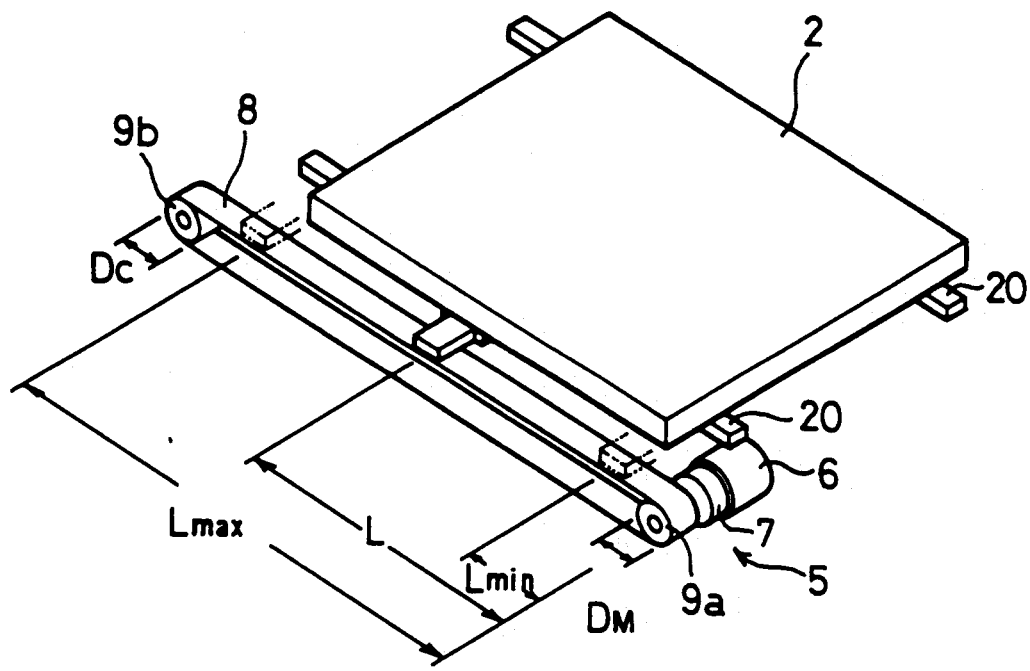
FIG. 3 is a perspective view illustrating a holder system in the form of a variable speed driving system.

The holder system composed as the variable speed driving system, as shown in FIG. 3, includes: the holder 2 movable along a guide rail 20; the holder driving motor 6 functioning as a driving source of the holder system; the reduction gear 7 directly connected to the motor 6; and the transmission belt 8 running on a driving pulley 9a and a driven pulley 9b for transmitting the rotation of the motor 6. The holder 2 moves along the guide rail 20 at the moving speed corresponding to the speed of rotation of the holder driving motor 6.

Figure 4:
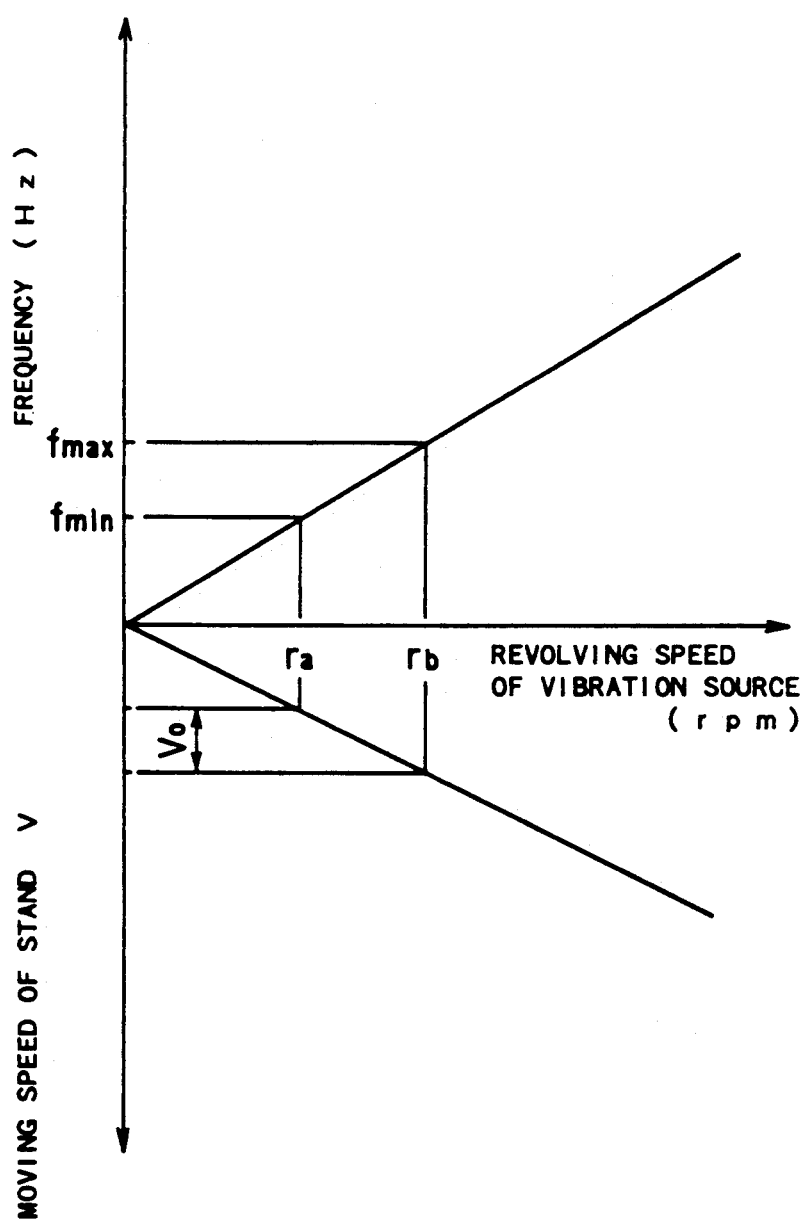
FIG. 4 is a graph showing the relationship between the frequency of a vibration source of the holder system including a driving motor and a reduction gear, the revolving speed of the vibration source, and the moving speed of a holder 2.

The holder system thus constructed also works as a vibration system including a vibration source and has its natural frequency. The frequency of the vibration source, that is, the driving motor 6 or the reduction gear 7, proportionally changes with the revolving speed thereof as seen in FIG. 4. When the holder driving motor 6 is rotated at a certain revolving speed, the frequency of the motor 6 may become close to the natural frequency of the holder system and cause a resonance, which results in an unstable movement of the holder 2. The moving speed of the holder 2 also proportionally changes with the revolving speed of the vibration source as shown in FIG. 4. The degree of the speed variation of the holder 2 is determined with the reduction ratio of the reduction gear 7 disposed in between the holder driving motor 6 and the holder 2.

Figure 5:
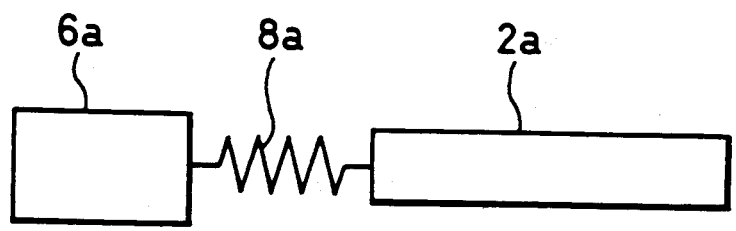
FIG. 5 is a view showing a typical example of a vibration system when the holder system is assumed to be a torsional vibration system with the degree of freedom '1'.

The holder system of the above structure is here assumed to be a torsional vibration system with the degree of freedom '1', which consists of a vibrator 2a, a belt 8a working as a spring, and a vibration source 6a shown in FIG. 5. The natural frequency of the holder system is computed in the following manner.

Equations of motion of the torsional vibration model thus assumed are expressed as:

(Equation 1):
$(DC/DM)^2 \times IM \times \ddot{\Theta}M + (DC/DM) \times (DM^2/4) \times K \times \Theta M - (DC/DM) \times (DM\, DC/4) \times K \times \Theta C = 0;$ and (Equation 2):
$IC \times \ddot{\Theta}C - (DM\, DC/4) \times K \times \Theta M + (DC^2/4) \times K \times \Theta C = 0;$ where K denotes the spring constant of the transmission belt 8; DM represents the diameter of the driving pulley 9a; DC represents the diameter of an equivalent pulley of the holder 2 corresponding to the driven pulley 9a; IM is the driving axis inertia determined by converting a total inertia of the holder driving motor 6, the reduction gear 7, and the driving pulley 9a to the inertia of the shaft of the driving pulley 9a; and IC represents the inertia of the holder 2.

The angular displacement $\Theta M$ of the driving pulley 9a and the angular displacement $\Theta C$ of the holder 2 converted to the value of the driven pulley 9a are written as:

$\Theta M = AM \times \mathrm{Sin}\,(\omega t + \psi);$ (Equation 3):

$\ddot{\Theta}M = -AM \times \omega^2 \times \mathrm{Sin}\,(\omega t + \psi);$ (Equation 4):

$\Theta C = AC \times \mathrm{Sin}\,(\omega t + \psi);$ and (Equation 5):

$$\ddot{\theta}C = -AC \times \omega^2 \times \sin(\omega t + \psi);\qquad \text{(Equation 6):}$$

where AM denotes the amplitude of the angular displacement of the driving pulley 9a; AC represents the amplitude of the angular displacement of the holder 2 converted to the value of the driving pulley 9a; ω represents the natural angular frequency; and ψ denotes the initial phase.

Equations 1 and 2 are rewritten by substituting Equations 3 through 6 therein:

(Equation 7):
$$-(DC/DM)^2 \times IM \times \omega^2 \times AM + (DC/DM) \times (DM^2/4) \times K \times AM - (DC/DM) \times (DM\,DC/4) \times K \times AC = 0;$$

and (Equation 8):
$$-(DM\,DC/4) \times K \times AM - IC \times \omega^2 \times AC + (DC^2/4) \times K \times AC = 0.$$

A vibration in the above vibration model shows existence of answers of Equations 7 and 8 other than AM=AC≠0. The determinant of the coefficients of Equations 7 and 8, which are shown by Equations 9 through 12, is thus equal to zero as shown by Equation 13:

$$a11 = -(DC/DM)^2 \times IM \times \omega^2 + (DC/DM) \times (DM^2/4) \times K \qquad \text{(Equation 9):}$$

$$a12 = -(DC/DM) \times (DM\,DC/4) \times K \qquad \text{(Equation 10):}$$

$$a21 = -(DM\,DC/4) \times K \qquad \text{(Equation 11):}$$

$$a22 = -IC \times \omega^2 + (DC^2/4) \times K \qquad \text{(Equation 12):}$$

(Equation 13):
$$\begin{vmatrix} a11 & a12 \\ a21 & a22 \end{vmatrix} = 0$$

Equation 13 is rewritten as:

(Equation 14):
$$\omega = 1/2 \sqrt{(K/DC(DM^3/IM + DC^3/IC))}$$

Since the natural angular frequency ω is equal to 2πf, the natural frequency f of the holder system (driving system) is expressed as:

(Equation 15):
$$f = 1/4\pi \sqrt{(K/DC(DM^3/IM + DC^3/IC))}$$

In the driving system including the transmission belt 8 shown in FIG. 3, a length L of the transmission belt 8 changes corresponding to the position of the holder 2, and the spring constant K varies according to the length L:

$$(EA/Lmin) \leq K \leq (EA/Lmax) \qquad \text{(Equation 16):}$$

where E denotes the vertical elastic modulus; A denotes the sectional area of the transmission belt 8; and Lmin and Lmax respectively denote the minimum and maximum lengths of the belt 8 corresponding to the position of the holder 2 shown in FIG. 3.

The natural frequency f of the holder system varies with the position of the holder 2 within a range between a minimum natural frequency fmin and a maximum natural frequency fmax, which are calculated according to Equation 15 based on the spring constant K determined with the minimum and maximum lengths Lmin and Lmax of the belt 8. The holder system accordingly has the natural frequency f varying from fmin to fmax. When the vibration source is rotated at a revolving speed between ra and rb respectively corresponding to the minimum natural frequency fmin and the maximum natural frequency fmax as shown in FIG. 4, the holder 2 is moved at a moving speed V0 corresponding to the revolution speed. Under these conditions, a resonance occurs in the holder system and causes unstable movement of the holder 2.

Since the moving speed of the holder 2 corresponds to the reproduction scale m, unstable movement of the holder 2 lowers the quality of a reproduced image by the scale m. Accordingly, the holder 2 is not moved at the moving speed v0 for ensuring the quality of the reproduced image.

Figure 6A:
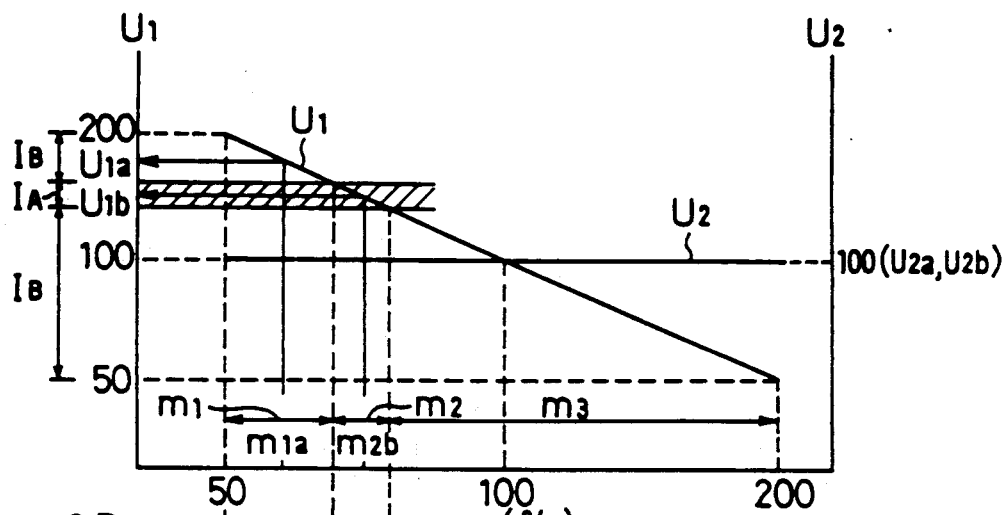
FIG. 6A and 6B are graphs showing the relationship between the rated speed U1 and U2 of the holder 2 and a cylindrical drum 10 and a reproduction scale m, and the relationship between their practical moving speeds V1 and V2 and the reproduction scale m, for explaining scaling scan control executed by the scanning exposure-reproduction apparatus of the embodiment.
Figure 6B:
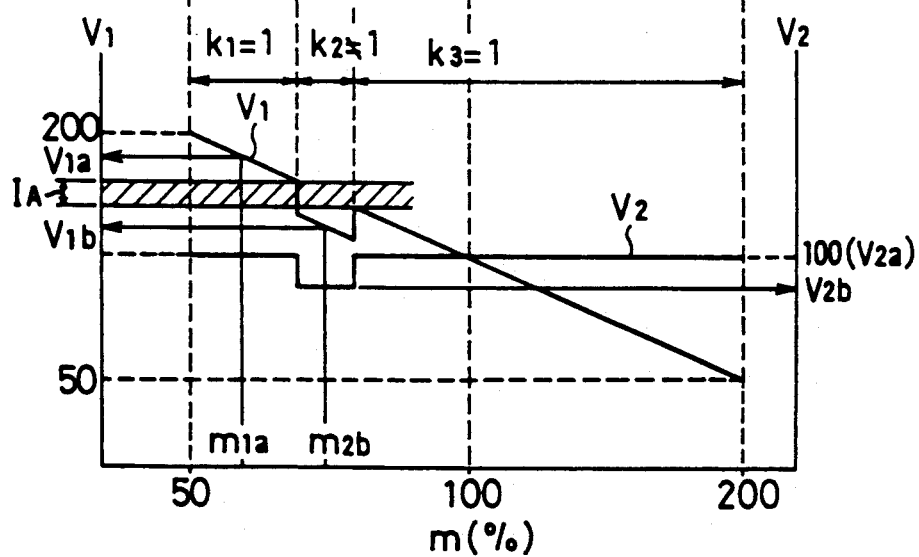
Figure 7:
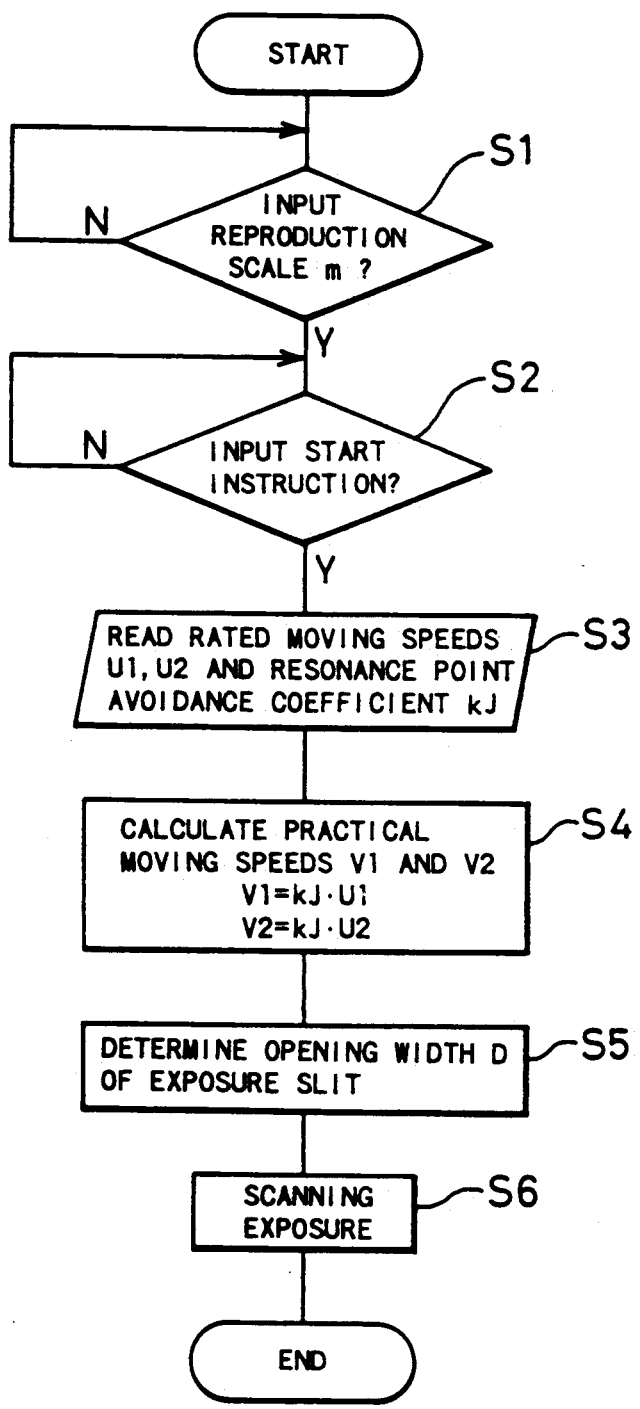
FIG. 7 is a flowchart showing the scaling scan control executed by the scanning exposure-reproduction apparatus of the embodiment.

Scaling scan control executed by the scanning exposure-reproduction apparatus of the embodiment to prevent undesirable change of the movement is described according to the graphs of FIG. 6A and 6B and the flowchart of FIG. 7.

FIG. 6A is a graph showing the relationship between the reproduction scale m and the rated speed U1 of the holder 2, which varies in a rated output range of the holder driving motor 6, and the constant rated speed U2 of the cylindrical drum 10, which is defined by Equation 17. On the other hand, the graph of FIG. 6B shows the relationship between the reproduction scale m and the practical moving speed V1 of the holder 2 and the practical moving speed V2 of the cylindrical drum 10 in reproduction, which is defined by Equation 18. The scale m is plotted as abscissa in both FIG. 6A and FIG. 6B while the rated speed U1 of the holder system and the rated speed U2 of the projection system is plotted as ordinate in FIG. 6A and the practical moving speeds V1 and V2 of the holder system and the projection system as ordinate in FIG. 6B.

$$m = U2/U1 \qquad \text{(Equation 17):}$$

$$m = V2/V1 \qquad \text{(Equation 18):}$$

The relationship between the rated speeds U1 and U2 and the practical moving speeds V1 and V2 of the holder 2 and the cylindrical drum 10 are explained hereinafter.

The range of the moving speed (U1min=50 and U1max=200) of the holder 2 is determined with the rated output of the holder driving motor 6 as described above. Since the holder system is a vibration system including a vibration source, the moving speed range includes an area in which the frequency of the vibration source such as the driving motor or the reduction gear is close to the frequency of the holder system, that is, a resonance speed area including one or plural resonance points of the system. The resonance speed area coincides with the range of the moving speed V0 of the holder 2 corresponding to the revolving speed varying in between ra and rb as seen in FIG. 4.

The resonance speed area is defined as the non-use speed area IA, which is previously separated from a movable speed area IB in the moving speed range and is not used as the moving speed of the system in reproduction. The rated speed U2 of the cylindrical drum 10 is set at a constant value excluding the resonance points of the driving system.

The rated speed U1 or U2 is correlated to the practical moving speed V1 or V2 for each scale range m1 through m3 separated from each other based on the areas IA and IB:

$$V1 = kJ \times U1 \ (J = 1 \text{ to } 3); \text{ and} \quad \text{(Equation 19):}$$

$$V2 = kJ \times U2 \ (J = 1 \text{ to } 3); \quad \text{(Equation 20):}$$

where kJ (J=1 to 3) is the resonance point avoidance coefficient set for each scale division m1 through m3; for example k1=, 0<k2<1, and k3=1 in the embodiment. When the reproduction scale m is in the range of m1 or m3, the practical moving speeds V1 and V2 in reproduction are respectively equal to the rated speeds U1 and U2. On the other hand, when the reproduction scale m is in the range of m2, the practical moving speeds V1 and V2 are determined by multiplying the rated speeds U1 and U2 by the coefficient k2 ($\neq 1$), respectively. The practical moving speeds V1 and V2 for each scale division m1 through m3 are changed by controlling the driving signals output from the driving circuits 5 and 11 of the holder 2 and the cylindrical drum 10 to the driving motors 6 and 12 and varying the revolving speeds of the motors 6 and 12 corresponding to the practical moving speeds V1 and V2. Since the coefficient k2 is greater than zero and less than one in the embodiment, the driving signals output to the driving motors 6 and 12 are reduced for the change of the moving speeds V1 and V2, which do not exceed the rated output of each driving motor 6 or 12.

The holder 2 and the cylindrical drum 10 are actually moved at the practical moving speeds V1 and V2 in reproduction. The practical moving speeds V1 and V2 are determined only by multiplying the rated speeds U1 and U2 by the resonance point avoidance coefficient kJ (J=1 to 3) as shown by Equations 19 and 20. Accordingly, the reproduction scale m corresponding to the ratio of the practical moving speed V1 of the holder 2 to the practical moving speed V2 of the cylindrical drum 10 coincides with the reproduction scale m corresponding to the rated speed U1 of the holder 2 to the rated speed U2 of the cylindrical drum 10 in any scale division m1 through m3.

The ROM 32 of the electronic control circuit 30 stores the resonance point avoidance coefficients kJ (J=1 to 3) and the rated speed U1 of the holder 2 and the rated speed U2 of the cylindrical drum 10 assigning to one another for each scale division m1 through m3. The data in the ROM 32 is used for determination of the practical moving speeds V1 and V2 corresponding to an externally input reproduction scale (described later). The resonance point avoidance coefficient k2 is previously set in such a manner that the practical moving speed V1 determined by multiplying the rated speed U1 of the holder 2 by the coefficient k2 is not within the non-used speed area IA but in the movable speed area IB.

The non-use speed area IA of the holder system may be determined by simulation of the natural frequency of the holder system (driving system) or alternatively by actual measurement of a test machine with high-speed Fourier operation. In the embodiment, the non-use speed area IA is determined by assuming the holder system to be a torsional vibration system with the degree of freedom '1' shown in FIG. 5.

The scaling scan control executed by the reproduction device of the embodiment is described according to the flowchart of FIG. 7.

It is determined whether a reproduction scale m is input through the control panel 21 at step S1, and it is determined whether start of reproduction is instructed through a start switch (not shown in figures) at step S2. The device waits for the input of the reproduction scale m and the start command.

When the answer is YES at both steps S1 and S2, the program proceeds to step S3 at which the rated speed U1 of the holder 2 and the rated speed U2 of the cylindrical drum 10 corresponding to the input reproduction scale m are read together with the resonance point avoidance coefficient k1, k2, or k3 determined with the reproduction scale m in one of the scale divisions m1 through m3. At step S4, the practical speeds V1 and V2 of the holder 2 and cylindrical drum 10 are determined with the rated speeds U1 and U2 and the resonance point avoidance coefficient k1, k2, or k3 according to Equations 19 and 20.

For example, when the input reproduction scale m is equal to m1a in the scale division m1 (see FIG. 6A), rated speeds U1a and U2a and the resonance point avoidance coefficient k1 (=1) corresponding to the reproduction scale m1a are read in, and practical moving speeds V1a and V2a of the holder 2 and the cylindrical drum 10 are determined with the above input data. The practical moving speeds V1a and V2a are defined by:

$$V1a = k1 \times U1a = U1a \ (k1 = 1); \text{ and} \quad \text{(Equation 21):}$$

$$V2a = k1 \times U2a = U2a \ (k1 = 1). \quad \text{(Equation 22):}$$

When the input reproduction scale m is equal to m2b in the scale division m2 (see FIG. 6A), rated speeds U1b and U2b and the resonance point avoidance coefficient k2 ($\neq 1$) corresponding to the reproduction scale m2b are read in, and practical moving speeds V1b and V2b of the holder 2 and the cylindrical drum 10 are determined with the above input data. The practical moving speeds V1b and V2b are defined by:

$$V1b = k2 \times U1b \neq U1b; \text{ and} \quad \text{(Equation 23):}$$

$$V2b = k2 \times U2b \neq U2b. \quad \text{(Equation 24):}$$

Since the rated speed U1b of the holder is in the non-use speed area IA of the holder system, the practical moving speed V1b of the holder 2 is set in the movable speed area IB other than the non-use speed area IA. The practical moving speed V2b of the cylindrical drum 10 is determined by multiplying the rated speed U2b by the resonance point avoidance coefficient k2 in such a manner that the reproduction scale corresponding to the ratio of the practical moving speeds V1b and V2b is made equal to the input reproduction scale m2b.

The opening width D of the exposure slit 16 is computed corresponding to the practical moving speeds V1 and V2 at step 5:

$$D = Sd100/4 \times (1 + m/100)^2; \quad \text{(Equation 25):}$$

where Sd100 denotes the opening width of the exposure slit 16 on the reproduction scale m of 100%. When the input reproduction scale m is within the scale range m2, the practical moving speed V2 of cylindrical drum 10 is changed from the value V2a to V2b, and the opening width D of the exposure slit is determined as:

$$D = k2 \times Sd100/4 \times (1 + m/100)^2. \quad \text{(Equation 26)}$$

Determination and adjustment of the opening width D of the exposure slit 16 corresponding to the reproduction scale m prevents insufficient or excessive exposure of the sensitized material 19 held on the cylindrical drum 10, thus improving the quality of the reproduced image. The opening width D of the exposure slit 16 is determined according to variation of the practical moving speed V2 of the cylindrical drum 10, thus ensuring the optimal exposure conditions for high quality of the reproduced image.

When the system including the cylindrical drum 10 is a variable speed driving system as described later, the opening width D of the exposure slit 16 is adjusted in the following manner. In this case, the practical moving speed V2 of the cylindrical drum 10 varies with the reproduction scale m, which may be set at a value corresponding to the speed causing resonance to variable speed driving system including the cylindrical drum 10.

When the reproduction scale m is set at a value corresponding to the speed which does not cause any resonance to the system of the cylindrical drum 10, Equation 25 is rewritten by considering only the speed of the cylindrical drum 10 to determine the opening width D. On the other hand, when the reproduction scale m is set at a value causing resonance, Equation 25 is rewritten by considering both the speed of the cylindrical drum 10 and the coefficient for preventing the resonance to determine the opening width D.

After completion of the processing at steps S1 through S5, the program proceeds to step S6 for scanning exposure, and a scaled image of an original 3 is reproduced on the sensitized material 19.

The electronic control circuit 30 outputs control signals to the electronic constituents of the reproduction device including the holder driving circuit 5 and the cylindrical drum driving circuit 11. The switch circuit 13a turns the light source 13 on at a predetermined quantity of light, and the solenoid driving circuit 25a opens the exposure slit 16 to the opening width D computed at step S4. The mirror driving circuit 24a sets the positions of the mirrors 14b and 14c to adjust the optical path while the lens driving circuit 23a sets the position of the lens 15 to adjust the focus. On completion of such adjustment, the cylindrical drum driving circuit 11 actuates the cylindrical drum 10 at the practical moving speed V2 determined at step S4, and the holder driving circuit 5 synchronously actuates the holder 2 at the practical moving speed V1 determined at step S4. A scaled image of the original 3 is then reproduced on the sensitized material 19.

As described above, in the scanning exposure-reproduction apparatus of the embodiment, even when the moving speed of the holder 2 corresponding to the input reproduction scale m is the rated speed U1 within the resonance speed area or the non-use speed area IA which causes a resonance based on the natural frequency of the holder system, the practical moving speed V1 of the holder 2 in actual reproduction is shifted from the non-use speed area IA to the movable speed area IB.

The scanning exposure-reproduction apparatus of the embodiment has the following effects:

(a) The device efficiently prevents unstable movement of the driving system due to resonance and improves the quality of the reproduced image; and (b) The practical moving speed V1 or V2 of each driving system is corrected with the resonance point avoidance coefficient kJ. Since the practical moving speeds V1 and V2 after adjustment are still in the ranges of the rated speeds U1 and U2, the device does not require any specific driving motor with a wider speed variation but efficiently applies a conventional driving motor with the standard rated speed. Namely, the device ensures high quality of the reproduced image at a low cost, and effectively improves the conventional device by only simple modification.

In the above embodiment, the holder 2 changes its moving speed corresponding to the input reproduction scale m while the cylindrical drum 10 is rotated at a constant speed except for avoidance of the resonance point. The projection system may, however, be composed as the variable speed driving system like the holder system.

Figure 8A:
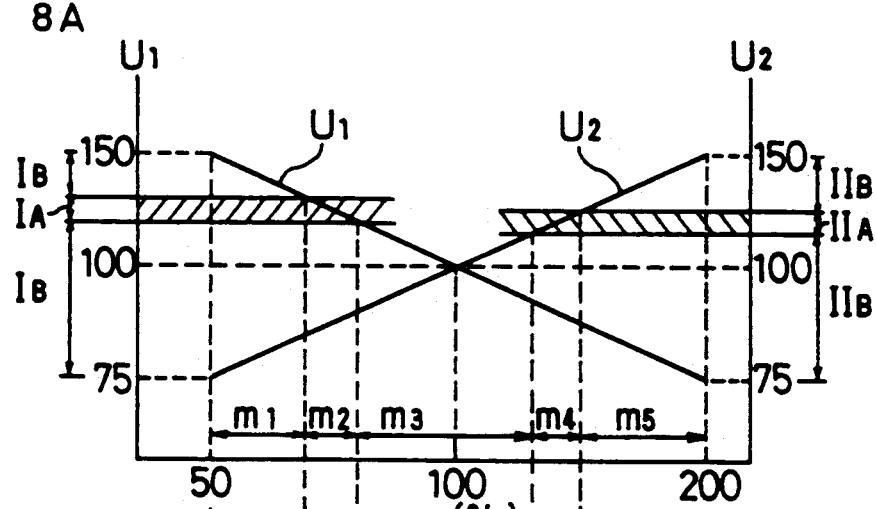
FIG. 8A and 8B are graphs similar to those of FIG. 6A and 6B, for explaining scaling scan control of a modified embodiment including a holder system and a projection system both composed as the variable speed driving system.
Figure 8B:
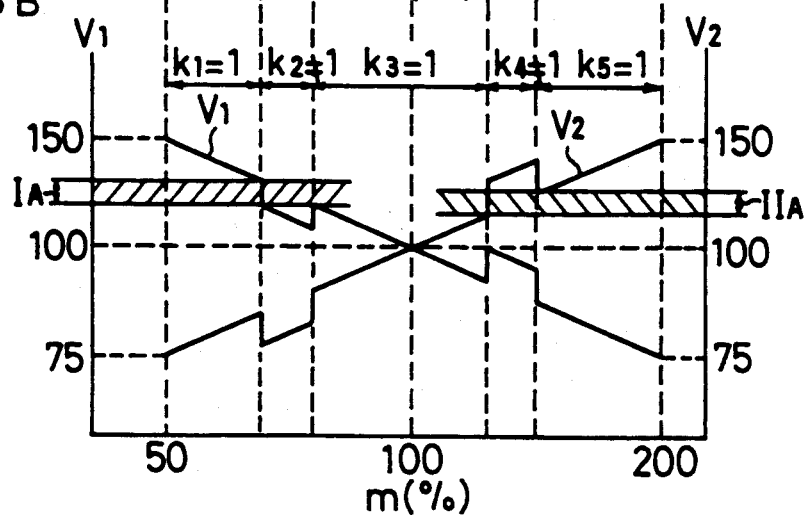

FIG. 8A and 8B are graphs similar to these of FIG. 6A and 6B with a holder system and a projection system both composed as the variable speed driving system.

When either of the rated speed U1 of the holder 2 and the rated speed U2 of the cylindrical drum 10 at any input reproduction scale m is within a non-use speed area IA or IIA, the practical moving speeds V1 and V2 of the driving systems are respectively determined not to be in the non-use speed area IA and IIA but to be in movable speed areas IB and IIB. Resonance point avoidance coefficients used here are $k1 = 1$; $0 < k2 < 1$; $k3 = 1$; $1 < k4$; and $k5 = 1$.

Although each driving circuit 5 or 11 has one non-use speed area IA or IIA in the embodiment, it may have two or more non-use speed areas corresponding to the number of resonance points. The resonance point avoidance coefficients k2 and k4 ($\neq 1$) may be greater than one or less than one on condition that the practical moving speed determined by multiplying the rated speed by the resonance point avoidance coefficient does not exceed the rated output of the driving motor.

Figure 9:
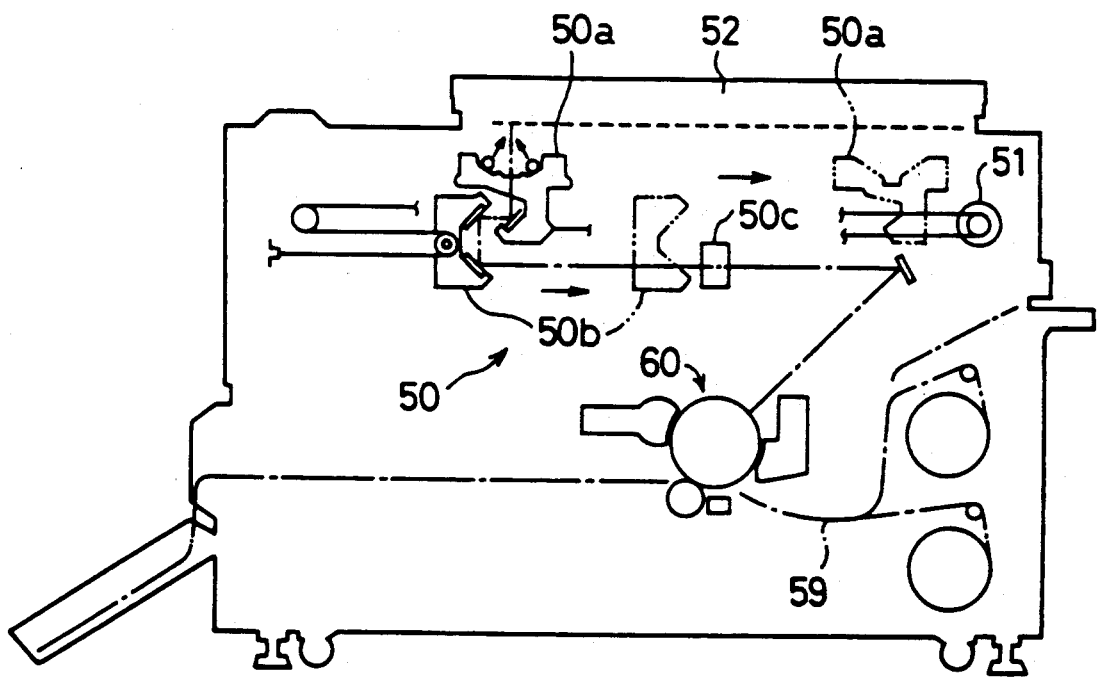
FIG. 9 is a schematic view illustrating a basic structure of another scanning exposure-reproduction apparatus which applies the principles of the scaling scan control.
Figure 10:
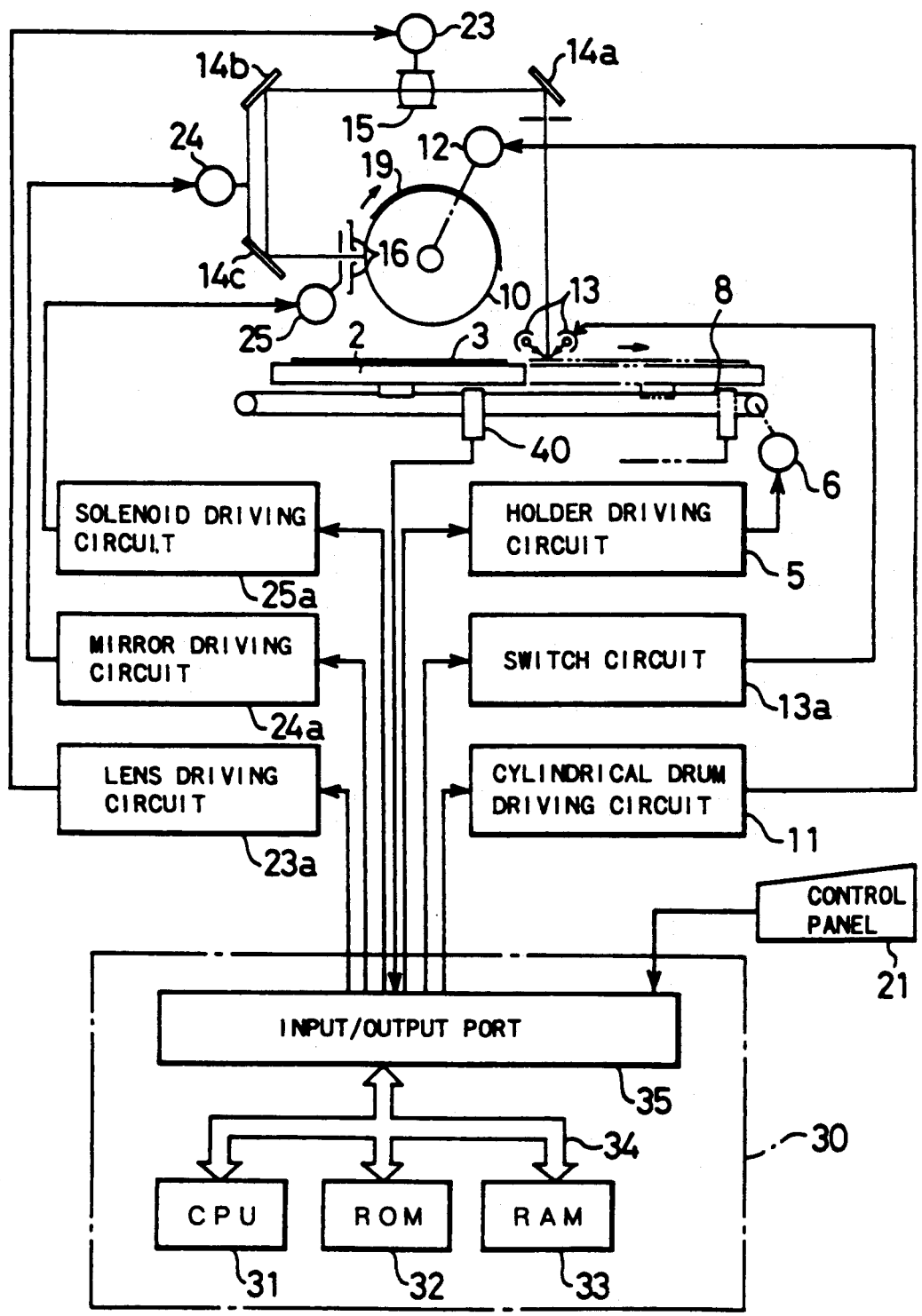
FIG. 10 is a block diagram showing electrical constituents of the scanning exposure reproduction device according to the modified embodiment.

The holder 2 and the cylindrical drum 10 are synchronously moved in the above embodiment. The invention may, however, be applied to a reproduction device including a fixed holder 52 52, and a set of mirror units 50a and 50b and an image recording drum 60, which are synchronously moved with each other, as shown in FIG. 9. The device of FIG. 9 further includes a focusing zoom lens 50c, a mirror driving motor 51, and a roll of copy paper 59. Optical devices including a holder 52 and the mirror units 50a and 50b constitute the photographing optical system while those including the focusing zoom lens 50c and the image recording drum 60 constitute the projecting optical system.

The device of the embodiment includes the cylindrical drum 10 or the image recording drum 60 as the projection base; however, the invention may be applied to a device with a scanning projection base such as a plane scanner.

Another modification of the embodiment is described hereinafter.

While the above embodiment assumes the driving system to be a vibration model and previously determines the non-use speed area of the driving system, the modification below detects actual vibration of the driving system during actuation and determines the non-use speed area of the driving system based on the detection.

The device of the modified embodiment has a vibration sensor or a piezoelectric vibration pick-up 40 including a piezoelectric element of lead zirconate in addition to the constituents of the above embodiment. Detection signals from the vibration sensor 40 are amplified in an amplifying circuit (not shown in figures) and input to the electronic control circuit 30. The vibration sensor 40 is moved with the holder 2 and detects vibration thereof during actuation of the holder 2.

When the actual vibration level of the holder 2 detected by the vibration sensor 40 exceeds a predetermined range, in which unevenness of an image due to unstable movement is negligible, the device sets the moving speed range of the holder 2 on the exceeding point as a non-use speed area, and determines the practical moving speed V1 of the holder 2 based on the results. The vibration of the holder 2 is detected on each reproduction, and the non-use speed area is corrected based on the detection. The device thus effectively prevents unstable movement of the holder system against the time and improves the quality of the reproduced image.

The above embodiment defines a limited resonance speed area including one or plural resonance points of the driving system or the holder system as the non-use speed area IA, and determines a practical moving speed by multiplying a rated speed in the non-use speed area IA by a resonance point avoidance coefficient (not equal to one).

Figure 11A:
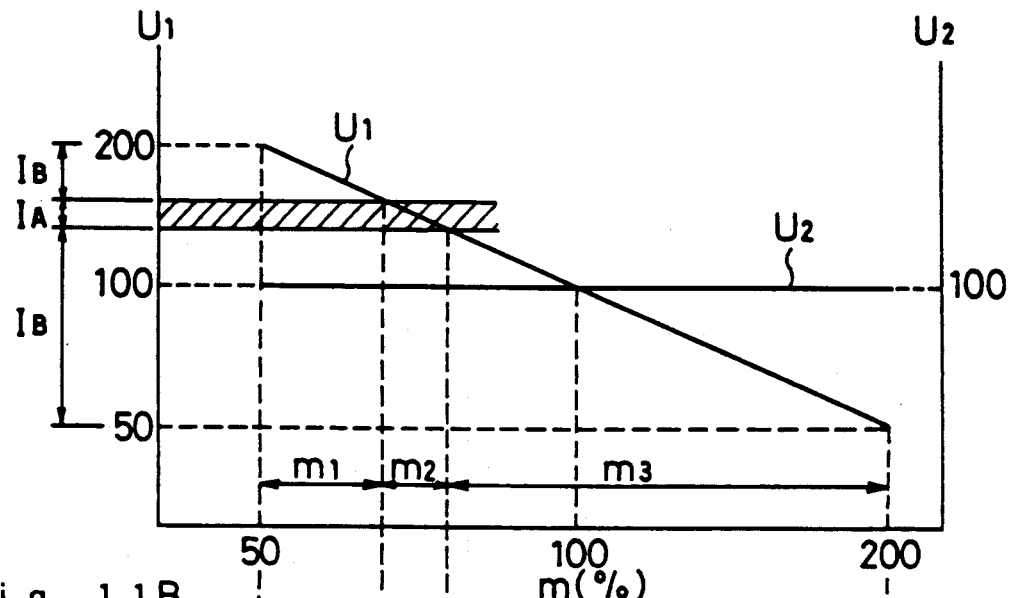
FIG. 11A and 11B are graphs similar to those of FIG. 6A and 6B for explaining scaling scan control of another modified embodiment.
Figure 11B:
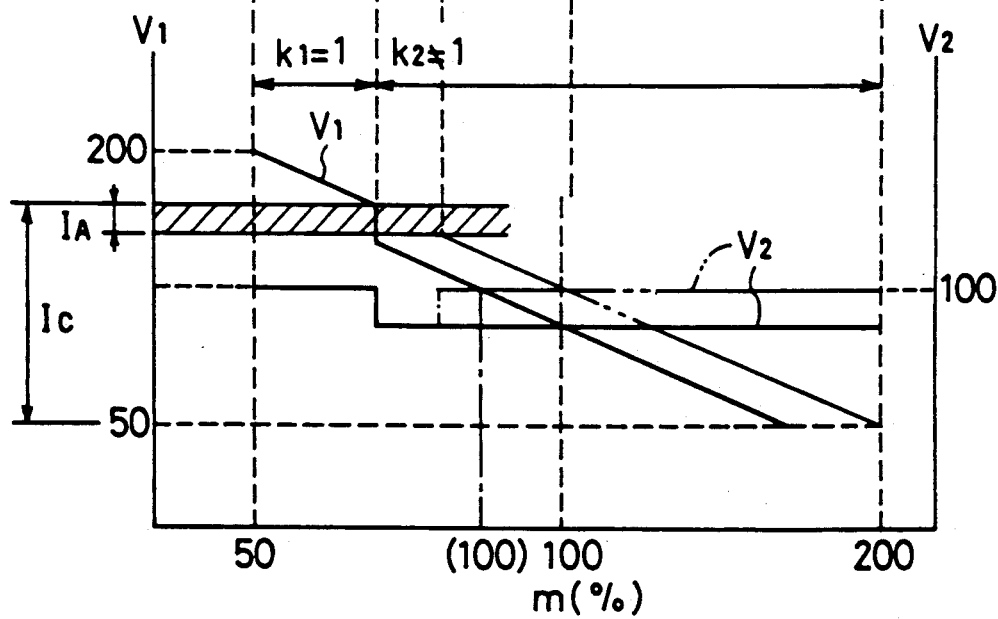

Alternatively, the resonance point avoidance coefficient (not equal to one) may be used for calculation of the practical moving speeds V1 and V2 of the holder 2 and the cylindrical drum 10 in a wide speed range including the non-use speed area. For example, the practical moving speeds V1 and V2 in a speed range IC including the non-use speed area IA are determined by multiplying either of or both the rated speeds U1 and U2 by the resonance point avoidance coefficient k2 ($\neq 1$) as seen in FIG. 11B. In this case, the graduations of the reproduction scale m on the abscissa are changed, while the reproduction scale m corresponding to the ratio of the practical moving speeds V1 and V2 of the holder 2 and the cylindrical drum 10 remains unchanged.

While the above embodiment improves the quality of the reproduced image by preventing resonance or unstable movement, another modified embodiment attains improvement of the quality by a wider range of the reproduction scale.

Figure 12A:
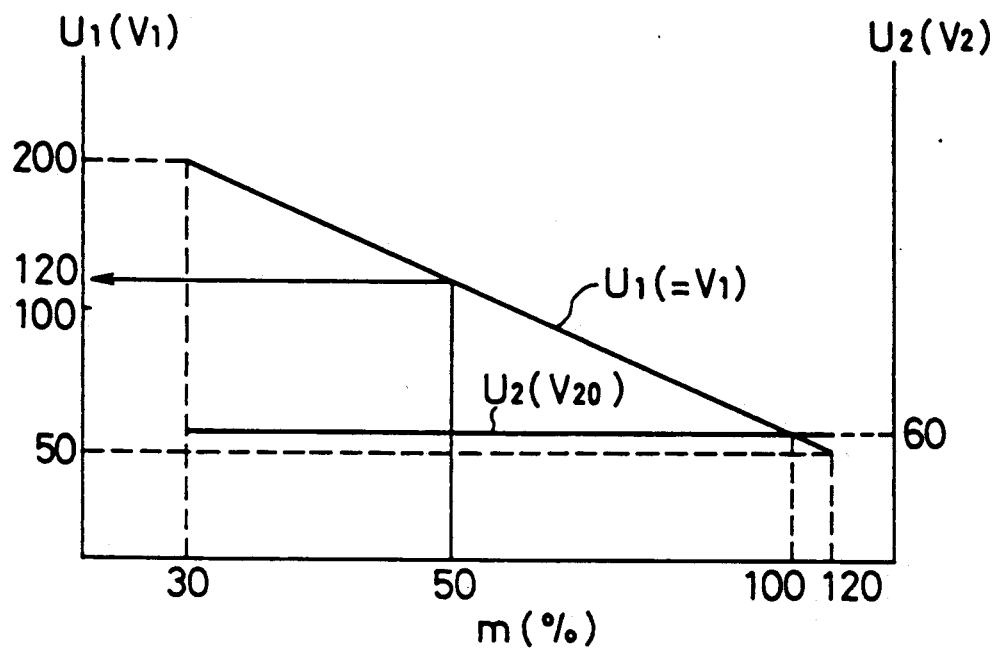
FIG. 12A and 12B are graphs similar to those of FIG. 6A and 6B for explaining scaling scan control of still another modified embodiment.
Figure 12B:
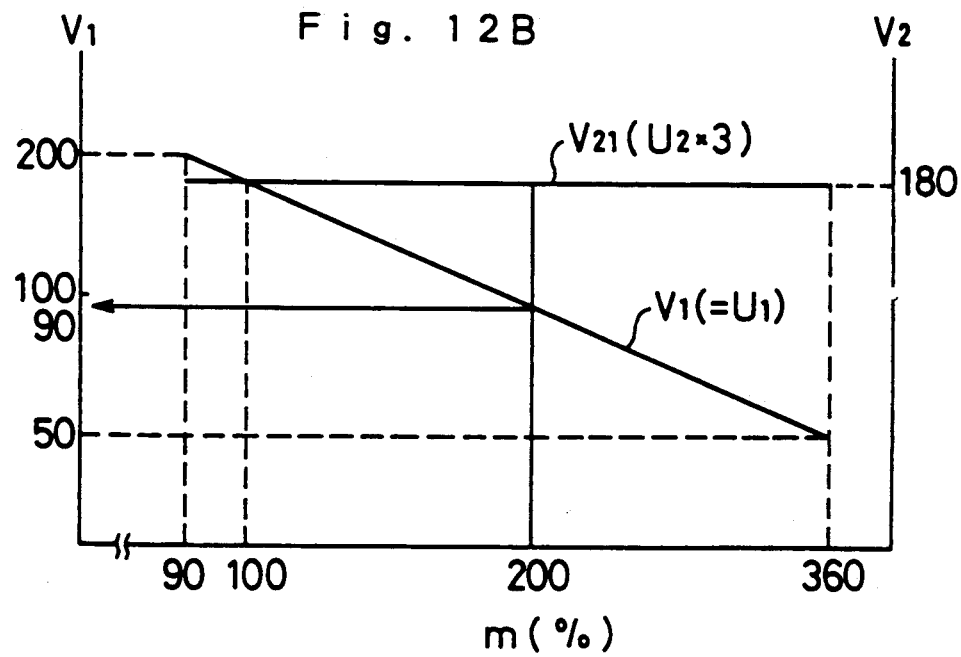

In this modification, the cylindrical drum 10 of the projection system is rotated at two different practical moving speeds V20 ($=1 \times U2 = 60$) and V21 ($=3 \times U2 = 180$) determined with the rated speed U2 as shown in FIG. 12A and 12B. For the purpose, a transmission gear mechanism with a 1:3 gear ratio is disposed in between the cylindrical drum 10 and the cylindrical drum driving motor 12. Alternatively, when the range of the rated revolving speed of the cylindrical drum driving motor 12 includes those corresponding to the practical moving speeds V20 and V21 of the cylindrical drum 10, the cylindrical drum 10 is rotated at the practical moving speeds V20 and V21 by varying the revolving speed of the cylindrical drum driving motor 12. In the modified embodiment, the practical moving speed V1 of the holder 2 is equal to the rated speed U1 (50 through 200), and the practical moving speeds V20 and V21 of the cylindrical drum 10 are set to prevent resonance of the projection system.

The device thus constructed attains a wider range of the reproduction scale without using any specific driving motor.

Since the reproduction scale m corresponds to the ratio of the practical moving speed of the holder 2 to the same of the cylindrical drum 10, the device allows the reproduction scale m to vary in a range between V20/V1 (30 to 120%) and V21/V1 (90 to 360%).

When a ratio in the range of V20/V1, for example, 50%, is input as the reproduction scale m through the control panel 21, the device determines the practical moving speeds V1 (120) and V20 (60) of the holder 2 and the cylindrical drum 10 based on the rated speeds U1 and U2 thereof and actuates the holder 2 and the cylindrical drum 10 at the determined moving speeds. On the other hand, when a ratio in the range of V21/V1, for example, 200%, is input as the reproduction scale m, the device determines the practical moving speeds V1 (90) and V2a (180) of the holder 2 and the cylindrical drum 10 and actuates the holder 2 and the cylindrical drum 10 at the determined moving speeds. When a ratio common to both the ranges of V20/V1 and V21/V1, for example 110%, is input as the reproduction scale m, a combination of the greater practical moving speeds (V21, V1) is preferentially selected.

The transmission gear mechanism changes the gear ratio of the cylindrical drum 10 to the cylindrical drum driving motor 12 from one to three according to the switch timing instructed by the electronic control circuit 30 prior to actuation of the holder 2. The gear ratio may be switched between three or more multi-stages instead of the two-stages of the embodiment, and the holder driving motor 6 of the holder system may also be composed as the cylindrical drum driving motor 12.

The device of the embodiment attains a wider range of the reproduction scale only by changing the moving speed of the cylindrical drum 10. Namely, the device does not require any repeated enlargement and ensures high quality of the reproduced image.

Although the present invention has been described and illustrated in detail, it is clearly to be understood that the same is by way of illustration and example only and is not to be taken by way of limitation, the spirit and scope of the present invention being limited only by the terms of the appended claims.

What is claimed is:

1. A scanning exposure-reproduction apparatus comprising:

a first, photographing optical system for photographing a slit image spanning a width of an original and for relatively moving a photographing position of said slit image in a longitudinal direction of said original;

a second, projecting optical system for projecting said slit image along a width of a sensitized material and for relatively moving an exposure position of said slit image in a longitudinal direction of said sensitized material;

a first variable speed driving means for varying a moving speed of one of said first and second optical systems at any rate within a multi-stage speed range and driving said one optical system at a speed that is variable;

a second variable speed driving means for driving the other of said first and second optical systems at a speed that is variable;

scale setting means for setting a reproduction scale of the original based on external instructions;

moving speed setting means for setting the moving speed of said one optical system at any rate within said multi-stage speed range and of the other optical system at a speed relative to said one optical system based on said reproduction scale where, for any reproduction scale, at least two moving speeds are available for each optical system from which said relative speed is still maintained; and speed control means for controlling said first variable speed driving means and said second variable speed driving means to actuate said optical systems at the moving speeds set by said moving speed setting means.

2. A scanning exposure-reproduction apparatus in accordance with claim 1, wherein said moving speed setting means comprises:

a speed range check unit for checking said variable relative moving speeds of said optical systems driven by said first variable speed driving means and said second variable speed driving means;

a speed ratio calculation unit for calculating possible ratio ranges of the moving speeds of said optical systems before and after a change of said relative moving speed of said one optical system based on the above check results; and a setting unit for determining which of said ratio ranges of the moving speeds corresponds to the reproduction scale set by said scale setting means and for setting the moving speed of said one optical system.

3. A scanning exposure-reproduction apparatus comprising:

a photographing optical system for photographing a slit image spanning the width of an original and for relatively moving the photographing position of said slit image in the longitudinal direction of said original;

a projecting optical system for projecting said slit image along the width of a sensitized material and for relatively moving the exposure position of said slit image in the longitudinal direction of said sensitized material;

scale setting means for setting said reproduction scale of the original based on external instructions;

moving speed setting means for respectively setting the relative moving speeds of said optical systems based on said reproduction scale wherein, for any reproduction scale, at least two moving speeds are available for each optical system from which said relative moving speeds are maintained;

moving speed check means for determining whether either of the moving speeds of said optical systems is within an inherent non-use speed area of said optical system; and non-use speed area setting means for setting a non-use speed area including the range of inherent non-use speed area in said optical system; and moving speed changing means for respectively changing, when the moving speed is determined to be within said non-use speed area by said moving speed check means, the moving speeds of said optical systems, which are set by said moving speed setting means, to different values while the ratio of the moving speeds of said optical systems remains unchanged.

4. A scaling reproduction method for reproducing an original by driving a photographing optical system for photographing a slit image spanning the width of an original and for relatively moving the photographing position of said slit image in the longitudinal direction of said original; and for using a projecting optical system for projecting said slit image along the width of a sensitized material and for relatively moving the exposure position of said slit image in the longitudinal direction of said sensitized material;

comprising the steps of:

pre-determining a rated speed pattern against a reproduction scale for a relative moving speed of each of said optical systems;

setting the rated speed pattern of at least one of said optical systems as monotonous speed variation pattern representing a monotonous variation of the moving speed against the reproduction scale;

creating a non-rated speed pattern of at least one of said optical systems by multiplying the moving speed in the rated speed pattern of said one optical system by a predetermined factor k;

computing the moving speeds of said optical systems based on the moving speed pattern, either the rated speed pattern or the non-rated speed pattern, of said one optical system and the moving speed pattern of the other optical system, so that the reproduction scale corresponding to the ratio of the moving speeds of said optical systems is made equal to an externally input reproduction scale where, for any reproduction scale, at least two moving speeds are available to each optical system from which said ratio of moving speeds is maintained; and moving said optical systems at the computed moving speeds.

5. A scaling reproduction method in accordance with claim 4, wherein said non-rated speed pattern is created for a variable speed driving system, namely for the optical system having the monotonous speed variation pattern as the rated speed pattern; said step further comprising the steps of:

non-use speed area setting step for setting a non-use speed area including the range of an inherent non-use speed area including the resonance point of said variable speed driving system;

dividing a moving speed range in the rated speed pattern of said non-use speed area of said variable speed driving system into a non-use speed area including a resonance point of said variable speed driving system and a movable speed area outside said non-use speed area;

determining whether an externally input reproduction scale is equal to a reproduction scale computed with the moving speed of said non-use speed area in the rated speed pattern of said variable speed driving system;

switching the moving speed pattern of said variable speed driving system from the rated speed pattern to the non-rated speed pattern when the input reproduction scale coincides with the reproduction scale computed with the moving speed of said non-use speed are, and setting said predetermined factor k, which is used for conversion between both the moving speed patterns, in such a manner that the moving speed of said non-rated speed pattern is made equal to the moving speed of said movable speed area; and changing the moving speed pattern of the optical system other than said variable speed driving system to a moving speed pattern determined by multiplying the moving speed in the rated speed pattern of said other optical system by the factor k, when the moving speed pattern of said variable speed driving system is switched from the rated speed pattern to the non-rated speed pattern.

6. A scaling reproduction method in accordance with claim 4, wherein said rated speed patterns previously determined for the relative moving speeds of said optical systems are a monotonous speed variation pattern representing a monotonous variation of the moving speed against the reproduction scale for one of said optical systems and a constant speed pattern of a predetermined constant speed for the other of said optical systems; and said non-rated speed pattern is created for the optical system having said constant speed pattern as the rated speed pattern.

7. A scaling reproduction method in accordance with claim 5, wherein said predetermined factor k is greater than zero and less than one.

8. A scanning exposure-reproduction apparatus for driving a photographing optical system for photographing a slit image spanning the width of an original and for relatively moving the photographing position of said slit image in the longitudinal direction of said original; and for using a projecting optical system for projecting said slit image along the width of a sensitized material and for relatively moving the exposure position of said slit image in the longitudinal direction of said sensitized material, and reproducing said original by a reproduction scale corresponding to a ratio of relative moving speeds of said optical systems;

comprising:

rated pattern memory means for storing a moving speed pattern representing said relative moving speed of each of said optical systems as a rated speed pattern against the reproduction scale, and specifically storing a monotonous speed variation pattern representing a monotonous variation of the moving speed against the reproduction scale as the rated speed pattern of at least one of said optical systems;

non-rated pattern creation means for creating a non-rated speed pattern of at least one of said optical systems by multiplying the moving speed in the rated speed pattern of said one optical system stored in said rated pattern memory means by a predetermined factor k;

first driving means for driving said one optical system with said non-rated speed pattern at the moving speed corresponding to said rated speed pattern or said non-rated speed pattern within a rated output of a driving source;

second driving means for driving the other of said optical systems;

moving speed computing means for computing the moving speeds of said optical systems based on the moving speed pattern, either the rated speed pattern or the non-rated speed pattern, of said one optical system and the moving speed pattern of said other optical system, so that the reproduction scale corresponding to the ratio of the moving speeds of said optical systems is made equal to an externally input reproduction scale, wherein, for any reproduction scale, at least two moving speeds are available for each optical system from which said ratio of moving speeds is maintained; and control means for controlling said first and second driving means and moving said optical systems at the computed moving speeds.

9. A scanning exposure-reproduction apparatus in accordance with claim 8, wherein said non-rated pattern creation means comprises:

a non-rated pattern memory for previously storing said non-rated speed pattern; and a moving speed pattern setting unit for switching the moving speed pattern of said one optical system with the non-rated speed pattern stored in the non-rated pattern memory between said rated speed pattern and said non-rated speed pattern according to the externally input reproduction scale.

10. A scanning exposure-reproduction apparatus in accordance with either claim 8 or claim 9, wherein said first driving means comprises:

a driving transmission having two gear ratios, that is, a fixed gear ratio and a ratio determined by multiplying said fixed gear ratio by said predetermined factor k, between a driving source of said one optical system with said non-rated speed pattern and a driving target; and said control means comprises:

a gear ratio switch for switching the gear ratio of said driving transmission when said one optical system with said non-rated speed pattern is moved.

11. A scanning exposure-reproduction apparatus in accordance with claim 8, wherein said non-rated pattern creation means creates said non-rated speed pattern of a variable speed driving system, namely an optical system having the monotonous speed variation pattern as the rated speed pattern, and comprises:

non-use speed area setting step for setting a non-use speed area including the range of an inherent non-use speed area including the resonance point of said variable speed driving system;

a range dividing unit for dividing a moving speed range in the rated speed pattern of said variable speed driving system into said non-use speed area of said variable speed driving system and a movable speed area other than said non-use speed area;

a factor memory for storing said predetermined factor k used for creation of said non-rated speed pattern as a scale factor for converting the moving speed in said non-rated speed pattern to the moving speed of said movable speed area;

a determination unit for determining whether an externally input reproduction scale is equal to a reproduction scale computed with the moving speed of said non-use speed area in the rated speed pattern of said variable speed driving system;

a pattern switch for switching the moving speed pattern of said variable speed driving system from the rated speed pattern to the non-rated speed pattern, which is obtained by multiplying the rated speed pattern by the predetermined factor k stored in said factor memory, when the input reproduction scale coincides with the reproduction scale computed with the moving speed of said non-use speed area, and a pattern change unit for changing the moving speed pattern of the optical system other than said variable speed driving system to a moving speed pattern determined by multiplying the moving speed in the rated speed pattern of said other optical system by the factor k, when the moving speed pattern of said variable speed driving system is switched from the rated speed pattern to the non-rated speed pattern.

12. A scanning exposure-reproduction apparatus in accordance with claim 8, wherein said rated pattern memory means stores a monotonous speed variation pattern representing a monotonous variation of the moving speed against the reproduction scale as the rated speed pattern of one of said optical systems, and a constant speed pattern of a predetermined constant speed as the rated speed pattern of the other of said optical systems; and said non-rated pattern creation means creates said non-rated speed pattern for the optical system having said constant speed pattern as the rated speed pattern.

* * * * *